(12) United States Patent
Aftanas (10) Patent No.: US 8,393,507 B2
(45) Date of Patent: Mar. 12, 2013

(54) VEHICLE ARTICLE CARRIER

(75) Inventor: Jeffrey M. Aftanas, Ortonville, MI (US)

(73) Assignee: JAC Products, Inc., Saline, MI (US)

( * ) Notice: Subject to any disclaimer, the term of this patent is extended or adjusted under 35 U.S.C. 154(b) by 184 days.

(21) Appl. No.: 13/041,639

(22) Filed: Mar. 7, 2011

(65) Prior Publication Data

US 2012/0228348 A1 Sep. 13, 2012

(51) Int. Cl.
*B60R 9/045* (2006.01)

(52) U.S. Cl. ............... 224/321; 224/309; 224/315

(58) Field of Classification Search ........... 224/309, 224/315, 321, 325, 326

See application file for complete search history.

(56) References Cited

U.S. PATENT DOCUMENTS

| | | | | |
|---|---|---|---|---|
| 4,911,348 | A | | 3/1990 | Rasor et al. |
| 5,143,267 | A | * | 9/1992 | Cucheran et al. ............ 224/321 |
| 5,170,920 | A | | 12/1992 | Corrente et al. |
| 5,385,285 | A | * | 1/1995 | Cucheran et al. ............ 224/321 |
| 5,588,572 | A | | 12/1996 | Cronce et al. |
| 5,845,828 | A | * | 12/1998 | Settelmayer ................. 224/321 |
| 6,010,048 | A | * | 1/2000 | Settelmayer ................. 224/321 |

OTHER PUBLICATIONS

U.S. Appl. No. 11/559,926, filed Nov. 15, 2006, Aftanas.
U.S. Appl. No. 11/923,028, filed Oct. 24, 2007, Kmita.
U.S. Appl. No. 12/136,854, filed Jun. 11, 2008, Aftanas.

\* cited by examiner

*Primary Examiner* — Justin Larson
*Assistant Examiner* — Adam Waggenspack
(74) *Attorney, Agent, or Firm* — Harness, Dickey & Pierce, P.L.C.

(57) ABSTRACT

A vehicle article carrier apparatus for supporting articles above an outer body surface of a vehicle that has a pair of support rails fixedly secured to the outer body surface. Each support rail may have at least one structural feature in a wall portion thereof. At least one cross bar having a pair of end supports may be supported on the support rails. At least one of the end supports may have a pivotally mounted locking lever and a pivotally mounted locking member operatively coupled together. The locking member may have an element adapted to engage the at least one structural feature in the support rail. Structure associated with each of the locking lever, a housing of the end support, and the locking member cooperate to prevent the locking lever from being moved into a seated position in a recess of the housing if the end support is not aligned with the structural feature in the support rail.

16 Claims, 6 Drawing Sheets

VEHICLE ARTICLE CARRIER

FIELD

The present disclosure relates to vehicle article carrier systems, and more particularly to a vehicle article carrier system employing an end support that cannot be fully locked to an associated support rail unless the end support is properly aligned with particular structure of the support rail.

BACKGROUND

The statements in this section merely provide background information related to the present disclosure and may not constitute prior art.

Vehicle article carriers are used in a wide variety of applications to support various articles above an outer body surface of a vehicle. In one specific implementation at least one cross bar is supported above the outer body surface by a pair of support rails. Typically the cross bar has an end support at each end thereof that is in some way coupled to one of the support rails to prevent the cross bar from moving along the support rails. In some previous systems the cross bar has structure that engages the support rail at predetermined locations along the support rail. It would be desirable to provide some form of end support for a cross bar that is able to be coupled at predetermined locations along a pair of support rails, but which cannot be locked to its respective support rail unless it is properly aligned at a predetermined longitudinal location on the support rails.

SUMMARY

In one aspect the present disclosure relates to a vehicle article carrier apparatus for supporting articles above an outer body surface of a vehicle. The apparatus may comprise a pair of support rails fixedly secured to the outer body surface and extending parallel to a major longitudinal axis of the vehicle. Each support rail may include at least one structural feature associated with a wall portion thereof. A pair of cross bars may be included that are adapted to be positioned to extend transversely between the support rails and to be supported on the support rails above the outer body surface, for supporting articles thereon. Each cross bar may include:

at least a pair of end supports, with each end support including:
a housing having a recess, the recess including a pocket therein;
a pivotally supported locking lever configured to be moved from an open, unlocked position, to a closed, locked position in which the locking lever is seated within the recess;
a locking member pivotally supported from the housing and operatively associated with the locking lever so as to be moved pivotally toward a wall of the support rail when the locking lever is moved from the open position to the closed position, and away from the wall when the locking member is moved from the closed position to the open position; and
the locking member, the housing and the locking lever each including structure that cooperatively enable the locking member to interfere with movement of the locking lever into the closed position when the end support is not longitudinally aligned with the structural feature in its respective said support rail.

In another aspect the present disclosure relates to a vehicle article carrier apparatus for supporting articles above an outer body surface of a vehicle. The apparatus may comprise a pair of support rails fixedly secured to the outer body surface and extending parallel to a major longitudinal axis of the vehicle. A pair of cross bars may be adapted to be positioned to extend transversely between the support rails and to be supported on the support rails above the outer body surface, for supporting articles thereon. Each cross bar may include:

a pair of end supports secured at opposing ends thereof, with each of the end supports including:
a housing having a recess, the recess including a pocket therein;
a pivotally supported locking lever configured to be moved from an open, unlocked position, to a closed, locked position in which the locking lever is seated within the recess;
a locking member pivotally supported from the housing and operatively associated with the locking lever so as to be moved pivotally when the locking lever is moved from the open position to the closed position, the locking member including an element for projecting into a hole in a wall portion of an associated one of the support rails when the end support is longitudinally aligned with the hole and the locking lever is moved into the closed position, thus enabling the locking lever to be seated in the recess; and
the locking member including a portion that interferes with a portion of the locking lever when the end support is not aligned with the hole and an attempt it made to move the locking lever into the closed position within the recess, to thus provide an indication to a user that the element of the end support is not engaged with the hole in the support rail.

In still another aspect the present disclosure may include a vehicle article carrier apparatus for supporting articles above an outer body surface of a vehicle. The apparatus may comprise a pair of support rails fixedly secured to the outer body surface and extending parallel to a major longitudinal axis of the vehicle. A pair of cross bars may be included that are adapted to be positioned to extend transversely between the support rails and to be supported on the support rails above the outer body surface, for supporting articles thereon. Each cross bar may include:

a pair of end supports secured at opposing ends thereof, with each end support including:
a housing having a recess, the recess including a pocket therein;
a pivotally supported locking lever configured to be moved from an open, unlocked position, to a closed, locked position in which the locking lever is seated within the recess;
a locking member pivotally supported from the housing and including a through hole;
a pivot block rotationally supported within the through hole;
a T-shaped member pivotally coupled to the locking lever and engaged with the pivot block to enable pivotal movement of the locking lever to cause a pivoting movement of the locking member when the locking lever is moved between the open position and the closed position;
the locking member further including an element that projects into a hole in a wall portion of an associated one of the support rails when the end support is longitudinally aligned with the hole and the locking lever is moved into the closed position, thus enabling the locking lever to be seated in the recess; and the locking member further including a projecting lip portion extending therefrom that projects into the pocket in the recess of the housing, and which interferes with the tongue of the locking lever when the end support is not aligned with the hole and an attempt is made to move the locking lever into the closed position within the recess. This provides an indication to a user that the element of the end support is not engaged with the hole in the support rail.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
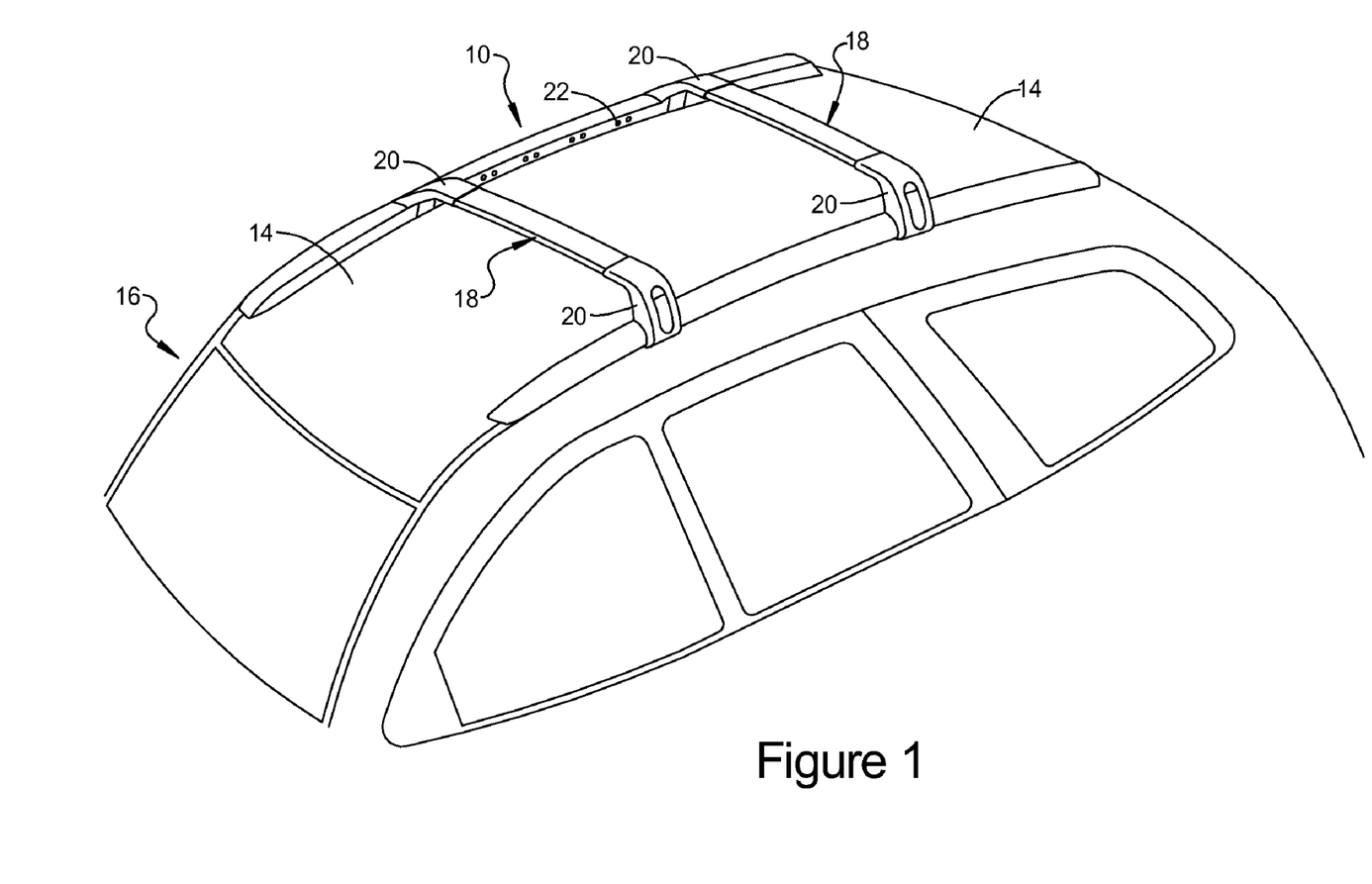
FIG. 1 is a simplified perspective view of one embodiment of a vehicle article carrier in accordance with the present disclosure.

Referring to FIG. 1 there is shown one embodiment of a vehicle article carrier 10 in accordance with the present disclosure. The vehicle article carrier 10 may have a pair of elongated support rails 12 that are fixedly secured to an outer body surface 14 of a vehicle 16 so as to extend generally parallel to a major longitudinal axis of the vehicle 16. One or more cross bars 18 may be removably secured to the support rails 12. Typically two cross bars 18 are employed and at least one is able to be positioned at various locations along the support rails 12. Each cross bar 18 may have an end support 20 at its opposing ends that may be locked to an associated one of the support rails 12. In this regard, in the embodiment illustrated in FIG. 1 each of the support rails 12 may have at least one structural feature 22, and more preferably a plurality of such structural features spaced along a longitudinal length thereof. In one embodiment the structural features 22 may form a plurality of holes, and will hereafter be referred to simply as "holes 22". The holes 22 may be formed so as to be spaced apart at predetermined locations along the longitudinal length of each support rail 12, with the holes 22 further being arranged such that each of the cross bars 18 may be secured to extend perpendicularly along between the support rails 12 when the end supports 20 are secured at the holes 22 in the support rails 12.

Figure 2:
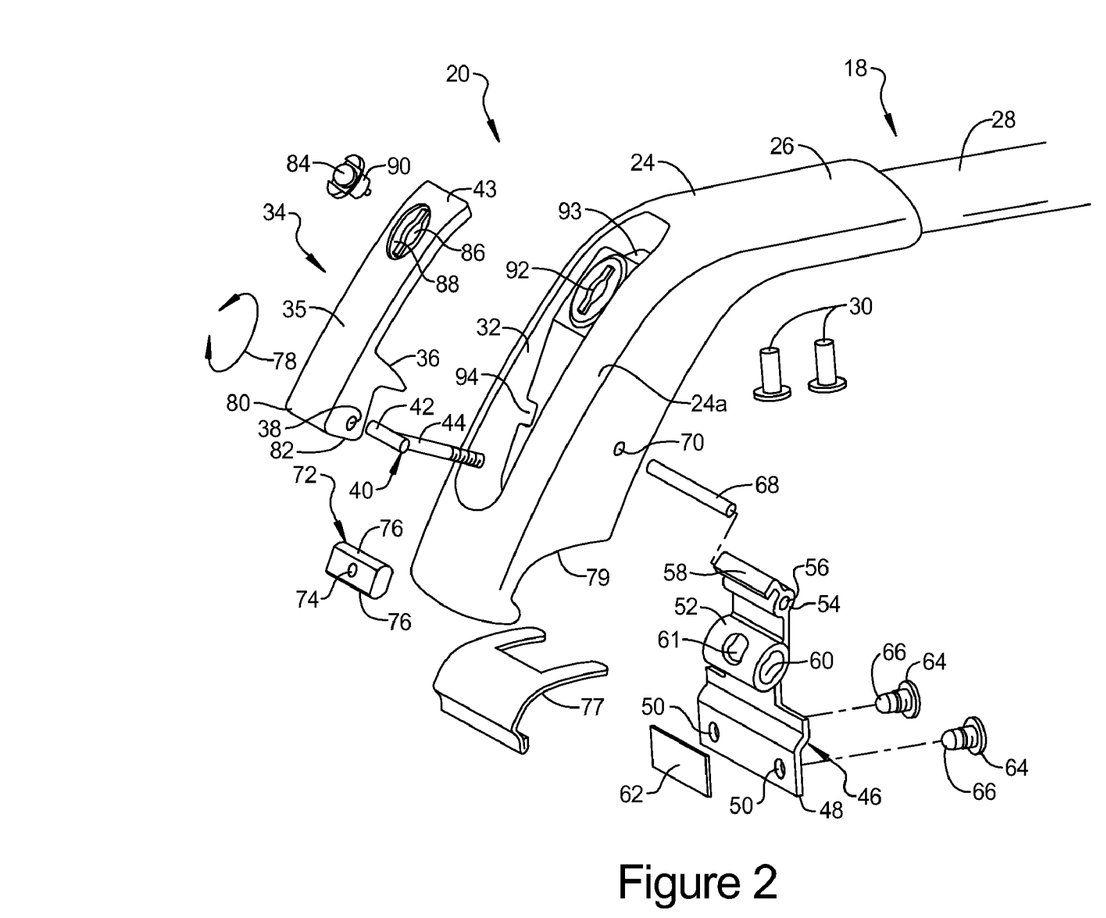
FIG. 2 is an exploded perspective view of one end support of one of the cross bars shown in FIG. 1.

With reference to FIG. 2, one of the end supports 20 can be seen in greater detail. It will be appreciated that each of the end supports 20 shown in FIG. 1 may be identical in construction. The end support 20 includes a housing 24 having a neck portion 26 which is fixedly secured to a tubular section 28 of the cross bar 18 via one or more threaded fasteners 30. The housing 24 also includes a recess 32 in which a pivotally mounted locking lever 34 resides when the locking lever 34 is in its fully locked position. With brief reference also to FIG. 5, the locking lever 34 can be seen to also include a pair of spaced apart tongues 36. The tongues 36 project into the recess 32 when the locking lever 34 is closed. The locking lever 34 further includes a bore 38 in which a head portion 42 of a T-shaped member 40 is captured. The head of the T-shaped member 40 is able to pivot about the head 42 when a user grasps an upper end 43 of the locking lever 34 and manipulates it towards or away from the recess 32. The T-shaped member 40 also allows the locking lever 34 to be rotated about a longitudinal axis extending through the threaded shaft portion 44, to thus apply a pre-tensioning force before the locking lever 34 is pivoted into its fully closed position, which will be explained further in the following paragraphs.

With further reference to FIG. 2 the end support 20 can also be seen to include a locking member 46 that is operatively coupled to the locking lever 34 when the end support 20 is fully assembled. The locking member 46 may have a depending panel portion 48 with a pair of threaded openings 50, a tubular portion 52, an upper end 54 having a bore 56, and a projecting lip portion 58. The tubular portion 52 may include a through hole 60 and a secondary hole 61 arranged transverse to the through hole 60, the purpose of both of which will be described shortly. A compliance member 62, which may be a suitably thick rubber pad, may also be included for protecting the surface of the support rail 12 and ensuring a suitably sufficient clamping force. A pair of threaded elements 64 having rounded nose portions 66, and preferably made from metal or some other suitable strong material, may be threaded into the threaded openings 50 of the panel portion 48. However, it will be appreciated that while a pair of the threaded elements 64 are used in this embodiment, that possibly a single threaded element 64, or possibly more than two such threaded elements 64, may be employed. In one embodiment the locking member 46 may be formed as a full die-cast component with a single projecting rounded nose portion.

Referring further to FIG. 2, the locking member 46 is pivotally supported relative to the housing 24 by a pivot pin 68 that extends through a bore 70 in the housing 24 and through the bore 56 in the upper end 56 of the locking member 46. A pivot block 72 having a threaded bore 74 has rounded sides 76 and is dimensioned to be slidably inserted within the through hole 60 of the locking member 46. The threaded shaft portion 44 is dimensioned to be threadably engaged within the threaded bore 74 of the pivot block 72 when the pivot block is inserted in through hole 60 and the threaded shaft portion 44 is inserted through the secondary hole 61 and threadably engaged in the threaded bore 74. The through hole 60 and rounded sides 76 of the pivot block 72 enable the pivot block to rotate freely within the through hole 60. The secondary hole 61 is dimensioned to provide the needed clearance for allowing a small degree of rotational movement between the threaded shaft portion 44 and the tubular portion 52. A second compliance member 77, which may be a suitably thick rubber pad, shaped in accordance with a contour of a lower surface 79 of the housing 24, which itself conforms to a profile of an upper portion of the support rail 12, may be secured to the lower surface 79 to protect the end support 20 and to ensure secure attachment of the end support 20 to its associated support rail 12 when the end support is clamped to the support rail 12.

Once the pivot block 72 and T-shaped member 40 are assembled to one another, and the pivot block 72 inserted in the through hole 60 of the locking member 46, then pivoting movement of the locking lever 34 will cause pivotal movement of the locking member 46 about the pivot pin 68. Rotational movement of the locking lever 34 in accordance with arrow 78 will cause a lower end 80 of the locking lever to be tightened, which effectively tightens the locking member 46, relative to the housing 24, when the locking lever 34 is urged from an open (unlocked) position to a closed (locked) position within the recess 32 in the housing 24. To this end it will be appreciated that an edge surface 82 at the lower end 80 of the locking lever 34 provides an over-center locking action which serves to help maintain the locking lever 34 in its locked position once the locking lever is fully seated in the recess 32. Optionally the locking lever 34 may also include a locking key 84 that may be disposed within a hole 86 at the upper end 43 of the locking lever 34. The locking key 84 may rest within a recess 88 and a keyed shaft portion 90 may engage within a key shaped opening 92 in the recess 32 of the housing 24. Rotation of the locking key 84 through manipulation with one or more fingers of a hand locks the upper end 43 of the locking lever 34 in its locked position in the recess 32 when the locking lever is fully seated within the recess 32. The recess 32 has a pocket portion 93 at an upper end thereof which permits the upper end 43 of the locking lever 34 to be engaged with a finger when the locking lever 34 is fully seated in the recess 32.

Figure 3:
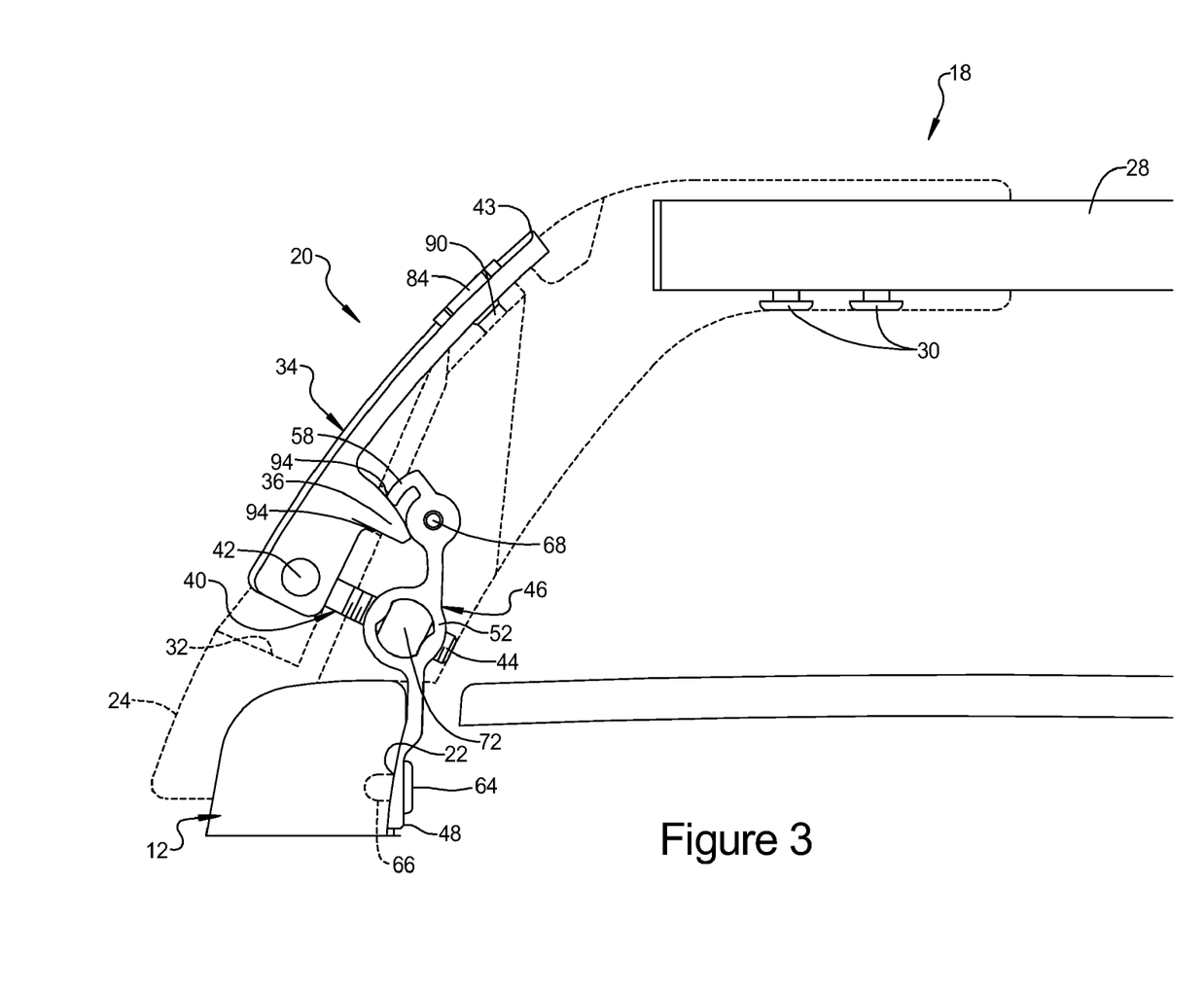
FIG. 3 is a side partial cross sectional view of the end support of FIG. 2 in assembled form, with the locking lever in its fully closed (i.e., locked) position.
Figure 5:
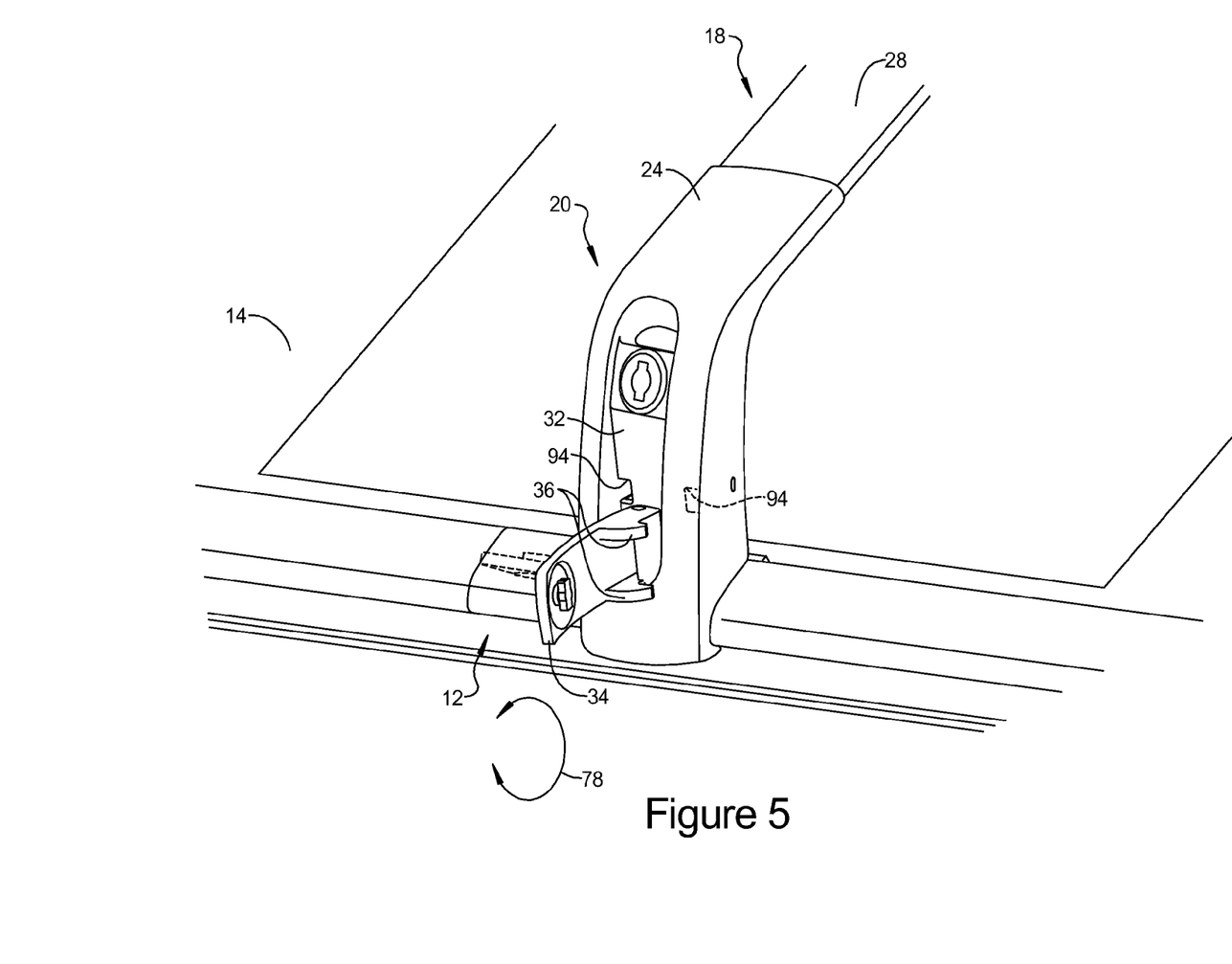
FIG. 5 is a perspective view of the end support of FIG. 3 illustrating the two tongue portions on the locking lever and the two corresponding pockets in the housing that the tongue portions engage in when the locking lever is fully seated in the recess of the housing.

With reference now to FIGS. 2, 3 and 5, the housing 24 can be seen to also include pockets 94 into which the tongues 36 project when the locking lever 34 is in its fully locked position, as shown specifically in FIG. 3. The rounded nose portion 66 is shown in phantom extending through one of the holes 22 in a wall portion 12a of the support rail 12 so as to project into an interior area of the support rail. Thus, when the end support 20 is longitudinally aligned with the hole 22, the rounded nose portions 66 of each of the threaded elements 64 can be fully seated within respective ones of the holes 22, and the projecting lip portion 58 of the locking member 46 will not interfere with entry of the tongues 36 into the pockets 94. Thus, complete seating of the locking lever 34 in the recess 32 can be accomplished. Put differently, when the end support 20 is longitudinally aligned with a pair of the holes 22, the rounded nose portions 66 of the threaded elements 64 are able to be fully engaged in the holes 22 in the support rail 12, and the projecting lip portion 58 will be positioned such that it is not blocking the pockets 94 in the recess 32. This allows the tongues 36 to move fully into the pockets 94, which in turn permits the locking lever 34 to be fully seated within the recess 32. When the locking lever 34 is in the closed (i.e. locked) position, an outer surface 35 is generally flush with an outer surface 24a of the housing 24, which provides the end support 20 with an aesthetically pleasing and highly aerodynamic profile.

Figure 4:
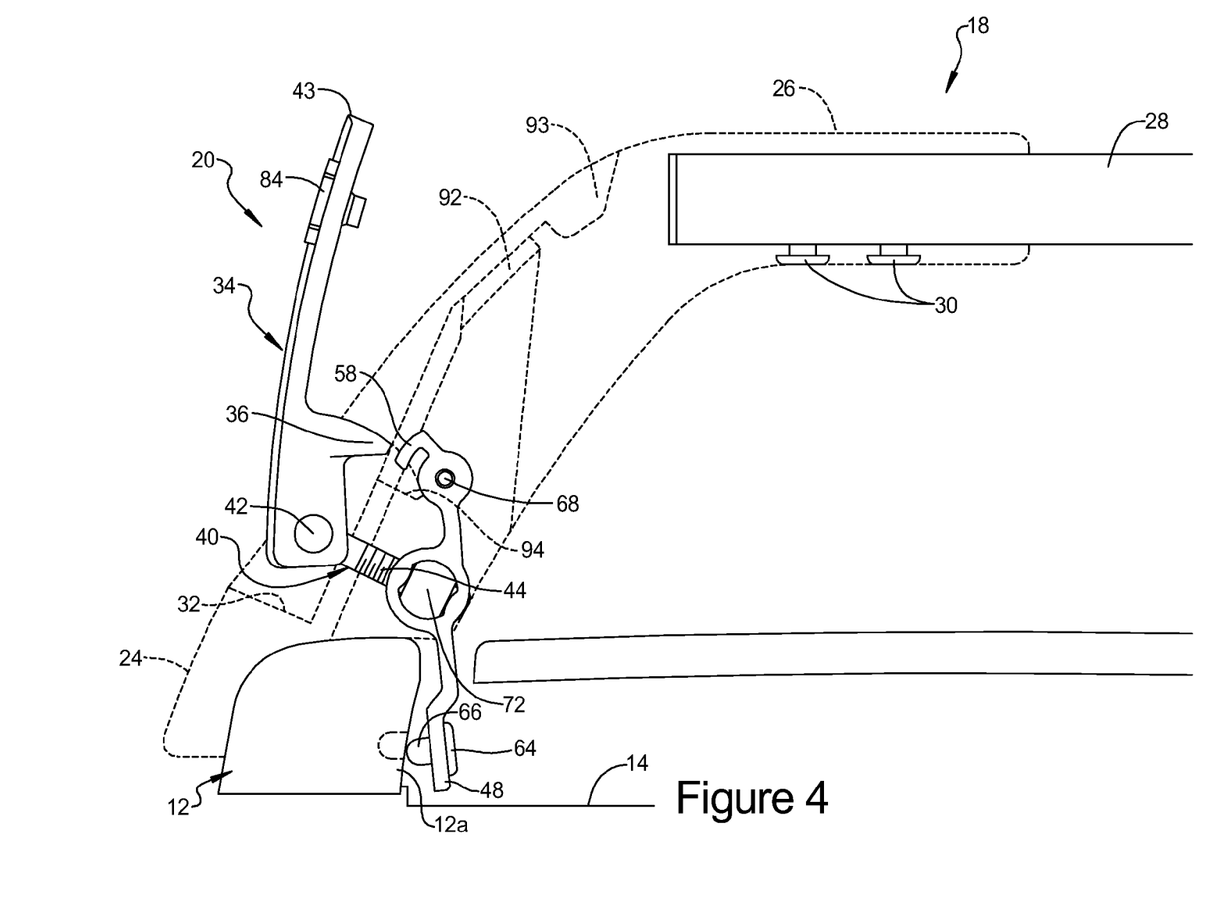
FIG. 4 is a side partial cross sectional view of the end support of FIG. 3 but with the rounded nose of the threaded element misaligned with a hole in the support rail, and illustrating how the locking lever is prevented from fully seating within the recess in the end support housing during this misalignment condition.

Referring briefly to FIG. 4, the end support 20 is shown when the end support 20 is not longitudinally aligned with the hole 22. The rounded nose portion 66 of the threaded element 64 is not aligned with the hole 22, and therefore is abutting an inner wall portion 12a of the support rail 12. In this position the tongues 36 are blocked from entering the pockets 94 by the projecting lip portion 58. As a result, the user will not be able to fully close the locking lever 34. This provides a highly useful means of indicating to the user that the end support 20 is not properly aligned with the holes 22 and is therefore not fully locked to the support rail 12. Accordingly, there is significantly less chance that the user may inadvertently leave the locking lever 34 in only a partially closed position.

Figure 6:
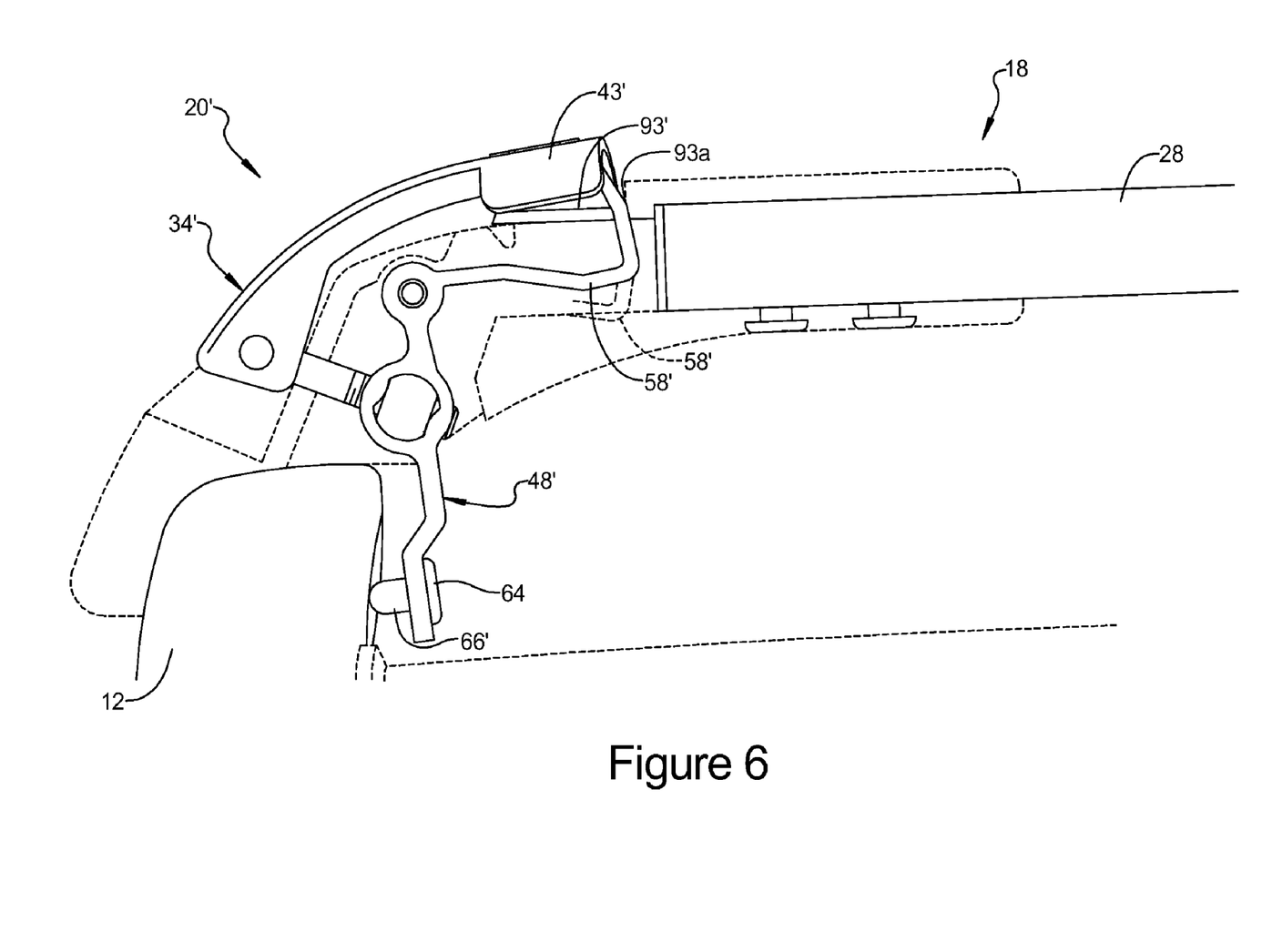
FIG. 6 is another embodiment of the end support illustrating how the locking member may be formed to include an elongated, angular projecting portion that extends through an opening in a pocket at an upper end of the end support housing.

Referring to FIG. 6 another embodiment of an end support 20' for the cross bar 18 is shown. End support 20' is substantially identical to the end support 20 and common components with those of the end support 20 will be denoted using the same reference number but with a prime (') symbol. A locking member 46' in this embodiment includes an elongated, angled projecting portion 58' that projects through a slot 93a in the pocket 93' of the housing 24' when the rounded noses 66' of the threaded elements 64' are not aligned with a pair of holes 22 in the support rail 12. The elongated, angled projecting portion 58' thus interferes with the upper end 43' of the locking lever 34' being fully seated within the recess 32' within the housing 24'. In this embodiment it will be noted that the tongue portions 36 of the locking lever 34 are not required. When the rounded noses 66' of the threaded elements 64' are fully seated within a corresponding pair of the holes 22, then the elongated, angled projecting portion 58' will be placed in a position (shown partially in phantom) that permits the locking lever 34' to be fully seated within the recess 32'. Those of ordinary skill in this art will appreciate that various other implementations of the locking members 46 and 46', that accomplish preventing the locking levers 34 or 34' from being fully seated in the recesses 32 or 32', will be possible as well, and that these examples are intended to be non-limiting.

The various embodiments thus form economical and easily implemented end support configurations that permit the user to be made aware from the end support is not properly aligned with the holes in a support rail. Advantageously, the various embodiments disclosed herein can be implemented with a relatively few independent component parts that do not appreciably increase the complexity of the end support either from a manufacturing complexity or an assembly complexity standpoint. The various components may be formed from high strength plastics, aluminum or steel (preferably stainless steel), or any other suitable components.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle article carrier apparatus for supporting articles above an outer body surface of a vehicle, the apparatus comprising:
    a pair of support rails fixedly secured to said outer body surface and extending parallel to a major longitudinal axis of the vehicle, each said support rail including at least one structural feature formed in a wall portion thereof;

a pair of cross bars adapted to be positioned to extend transversely between the support rails and to be supported on the support rails above the outer body surface, for supporting articles thereon;

each cross bar including a pair of end supports secured at opposing ends thereof;

at least a pair of said end supports each including:

a housing having a recess, the recess including a pocket therein;

a pivotally supported locking lever configured to be moved from an open, unlocked position, to a closed, locked position in which the locking lever is seated within the recess;

a locking member pivotally supported from the housing and operatively associated with the locking lever so as to be moved pivotally toward a wall of the support rail when the locking lever is moved from the open position to the closed position, and away from the wall when the locking member is moved from the closed position to the open position; and the locking member, the housing and the locking lever each including structure that cooperatively enable the locking member to interfere with movement of the locking lever into the closed position when the end support is not longitudinally aligned with the structural feature in its respective said support rail; the structure of the locking lever includes at least one tongue projecting from the locking lever; the structure of the locking member includes a projecting lip portion; and the structure of the housing includes a pocket formed in the recess; and wherein the projecting lip portion is configured to project into the pocket to obstruct movement of the tongue into the pocket when the end support is not aligned with the structural feature in the support rail and the locking lever is moved at least partially into the recess, and the projecting lip portion is configured to not protrude into the pocket when the end support is aligned with the structural feature and the locking lever is moved into the recess.

2. The apparatus of claim 1, wherein the structural feature of each one of the support rails comprises a hole formed in the wall of its said respective support rail.

3. The apparatus of claim 1, further comprising a locking key supported on the locking lever; and wherein the housing includes a key-shaped opening adapted to receive a portion of the locking key when the locking lever is seated within the recess.

4. The apparatus of claim 1, further comprising:

a T-shaped member that is pivotally coupled to the locking lever;

a pivot block that is rotationally supported within a through hole in the locking member; and wherein the operative coupling of the locking member and the locking lever is accomplished by a portion of the T-shaped member engaging with the pivot block such that pivotal movement of the locking lever causes a pivoting movement of the locking member.

5. The apparatus of claim 1, wherein the locking lever includes a pair of threaded elements each having a rounded nose portion, and wherein the hole in the support rail comprises a pair of spaced apart holes, and wherein the rounded nose portions engage in the pair of holes when the end support is aligned with the pair of holes and the locking lever is moved into the closed position.

6. A vehicle article carrier apparatus for supporting articles above an outer body surface of a vehicle, the apparatus comprising:

a pair of support rails fixedly secured to said outer body surface and extending parallel to a major longitudinal axis of the vehicle;

a pair of cross bars adapted to be positioned to extend transversely between the support rails and to be supported on the support rails above the outer body surface, for supporting articles thereon;

each cross bar including a pair of end supports secured at opposing ends thereof;

at least a pair of said end supports each including:

a housing having a recess, the recess including a pocket therein;

a pivotally supported locking lever configured to be moved from an open, unlocked position, to a closed, locked position in which the locking lever is seated within the recess;

a locking member pivotally supported from the housing and operatively associated with the locking lever so as to be moved pivotally when the locking lever is moved from the open position to the closed position, the locking member including an element for projecting into a hole in a wall portion of an associated one of the support rails when the end support is longitudinally aligned with the hole and the locking lever is moved into the closed position, thus enabling the locking lever to be seated in the recess; and the locking member including a portion that interferes with a portion of the locking lever when the end support is not aligned with the hole and an attempt is made to move the locking lever into the closed position within the recess, to thus provide an indication to a user that the element of the end support is not engaged with the hole in the support rail the portion of the locking lever comprises at least one tongue that projects from the locking lever; the portion of the locking member comprises a projecting lip portion; and the projecting lip portion projects at least partially into the pocket to block the pocket when the end support is not aligned with the hole in the support rail and the locking lever is moved towards its closed position relative to the housing, and does not project at least partially into the pocket to block the pocket when the end support is aligned with the hole in the support rail and the locking lever is moved towards its closed position relative to the housing.

7. The apparatus of claim 6, wherein the element of the locking member includes a threaded element that projects from the locking member.

8. The apparatus of claim 6, wherein the locking lever further includes a locking key and the housing includes a key-shaped opening that engages the locking key when the locking lever is in its closed position seated within the recess in the housing.

9. The apparatus of claim 6, wherein the locking member includes a panel portion depending therefrom, and wherein a pair of the elements is secured to the panel portion, the pair of the elements comprising a pair of threaded elements that each includes a rounded nose portion.

10. The apparatus of claim 6, wherein the locking lever can be pivoted about a first axis and rotated about a second axis.

11. The apparatus of claim 6, further comprising:

a T-shaped member having a threaded shaft portion and a head that is pivotally supported from the locking lever; and a pivot block that is rotationally supported in a through hole in the locking member, the pivot block including a threaded hole that engages the threaded shaft of the T-shaped member to accomplish the operative coupling of the locking lever to the locking member, the operative coupling enabling rotational movement of the pivot block within the through hole of the locking member when the locking lever is moved between the open and closed positions.

12. The apparatus of claim 6, wherein a lower surface of the housing is shaped in accordance with a profile of an upper portion of the support rail on which the end support is disposed.

13. A vehicle article carrier apparatus for supporting articles above an outer body surface of a vehicle, the apparatus comprising:
- a pair of support rails fixedly secured to said outer body surface and extending parallel to a major longitudinal axis of the vehicle;
- a pair of cross bars adapted to be positioned to extend transversely between the support rails and to be supported on the support rails above the outer body surface, for supporting articles thereon;
- each cross bar including a pair of end supports secured at opposing ends thereof;
- at least a pair of said end supports each including:
  - a housing having a recess, the recess including a pocket therein;
  - a pivotally supported locking lever configured to be moved from an open, unlocked position, to a closed, locked position in which the locking lever is seated within the recess;
  - a locking member pivotally supported from the housing and including a through hole;
  - a pivot block rotationally supported within the through hole;
  - a T-shaped member pivotally coupled to the locking lever and engaged with the pivot block to enable pivotal movement of the locking lever to cause a pivoting movement of the locking member when the locking lever is moved between the open position and the closed position;
  - the locking member further including an element that projects into a hole in a wall portion of an associated one of the support rails when the end support is longitudinally aligned with the hole and the locking lever is moved into the closed position, thus enabling the locking lever to be seated in the recess; and
  - the locking member further including a projecting lip portion extending therefrom that projects into the pocket in the recess of the housing, and which interferes with the tongue of the locking lever when the end support is not aligned with the hole and an attempt is made to move the locking lever into the closed position within the recess, to thus provide an indication to a user that the element of the end support is not engaged with the hole in the support rail and the projecting lip portion does not project into the pocket in the recess of the housing when the end support is aligned with the hole and an attempt is made to move the locking lever into the closed position within the recess.

14. The apparatus of claim 13, further included a locking key carried on the locking lever, and further comprising a key-shaped opening in the recess for engaging the locking key when the locking lever is seated within the recess of the end support.

15. The apparatus of claim 13, wherein the element of the locking member comprises a pair of spaced apart threaded elements each having a rounded nose portion, the rounded nose portions sized to engage with a corresponding pair of the holes in the support rail.

16. The apparatus of claim 13, wherein an outer surface of the locking lever rests flush with an outer surface of the housing when the locking lever is seated within the recess.

\* \* \* \* \*